Nov. 5, 1963 J. K. BRADLEY 3,109,887
COLOR TELEVISION RECEIVER
Filed Oct. 20, 1960

INVENTOR.
JAMES K. BRADLEY
BY
Fordyce A. Bothwell
ATTORNEY

United States Patent Office 3,109,887

Patented Nov. 5, 1963

3,109,887

COLOR TELEVISION RECEIVER

James K. Bradley, Wayne, Pa., assignor, by mesne assignments, to Philco Corporation, Philadelphia, Pa., a corporation of Delaware Filed Oct. 20, 1960, Ser. No. 63,854
5 Claims. (Cl. 178—5.4)

Figure 1:
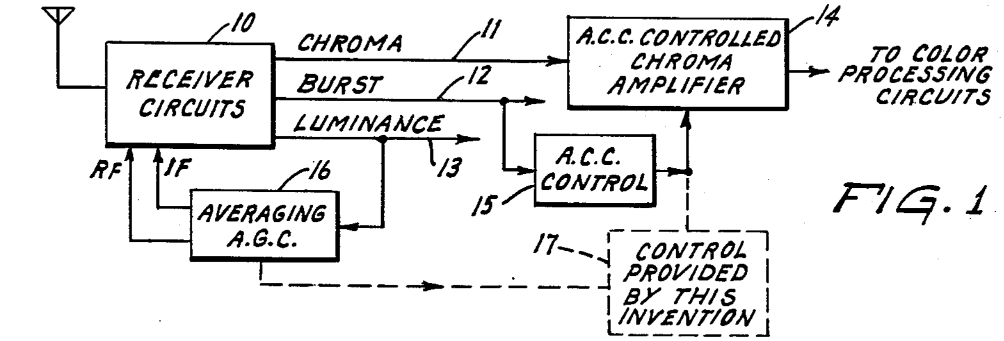

This invention relates to color television receivers and more particularly to automatic chroma control (A.C.C.) in such receivers.

As is now well understood, automatic chroma control is desirable in a color television receiver to compensate for undesired variations in amplitude of the chrominance component of the transmitted composite color signal relative to the luminance component thereof, such as variations due to multi-path propagation. Such variations occur due to the fact that the chrominance component occupies the upper portion of the transmitted signal band and therefore involves frequencies substantially higher than luminance component frequencies in the lower portion of said band. Since the color reference burst of the now-standard color television signal consists of a number of cycles of the unmodulated color sub-carrier occurring during the horizontal blanking intervals, the burst is subject to the same amplitude variations as is the chrominance component, and automatic chroma control is effected by developing a control signal according to the amplitude of the burst and utilizing such control signal to control the gain of a chroma amplifier in inverse relation to such variations.

It is also desirable to provide automatic gain control (A.G.C.) to control the overall gain of the receiver so as to compensate for variations in strength of the received composite signal. In one type of A.G.C. system known as gated A.G.C., the control action is responsive to the amplitude of the horizontal sync pulses which is representative of the strength of the received composite signal. In another type of A.G.C. system known as averaging A.G.C., the control action is responsive to the average amplitude of the composite signal, and therefore the control is a function not only of signal strength but also of average brightness level of the signal. This averaging type of A.G.C. is less expensive and therefore it is employed in the lower-priced color television receivers.

However, the use of both automatic chroma control and averaging A.G.C. has given rise to a serious problem. The purpose of automatic chroma control is to reproduce accurately the colors in the object or scene being televised, and to this end the control is intended to compensate for undesired variations in the amplitude of the chrominance component which tend to introduce color error. However, the averaging A.G.C. varies the overall gain of the receiver in inverse relation to the average brightness level of the signal and this tends to degrade the color reproduction and thus tends to defeat the purpose of automatic chroma control. When the average brightness level of the signal is high the A.G.C. decreases the overall gain of the receiver, and when the average brightness level is low the A.G.C. increases the overall gain of the receiver. The effect of this on the color reproduction, in a receiver employing A.G.C., is to cause over-saturation when the average brightness level is high and under-saturation when the average brightness level is low for the following reasons.

The averaging A.G.C. effectively compresses the range of average brightness variation between various scenes by varying the receiver gain in inverse relation to the average brightness level. This causes undesirable variation in amplitude of the burst in inverse relation to the average brightness level and thus causes undesired A.C.C. action. When the average brightness level is high, the decrease in receiver gain causes decrease of the brust amplitude and the A.C.C. increases the gain of a chroma amplifier and causes over-coloring of the picture. Conversely, when the average brightness level is low, the increase in receiver gain causes increase of the brust amplitude and the A.C.C. decreases the gain of the chroma amplifier and causes undercoloring of the picture. The loss of color for scenes of low average brightness is particularly objectionable.

The principal object of the present invention is to provide a satisfactory solution of this problem.

Another object of the invention is to provide a simple and inexpensive arrangement for preventing the undesirable degrading of the color reproduction.

In accordance with this invention the objectionable degradation of the color reproduction is prevented, or at least reduced to insignificance, by controlling the gain of a chroma amplifier in response to A.G.C. changes in the receiver gain for different average brightness levels. Thus when the receiver gain is decreased at high average brightness level, the gain of the chroma amplifier is decreased to prevent over-saturation in the reproduced color image; and when the receiver gain is increased at low average brightness level, the gain of the chroma amplifier is increased to prevent under-saturation in the color image.

Figure 2:
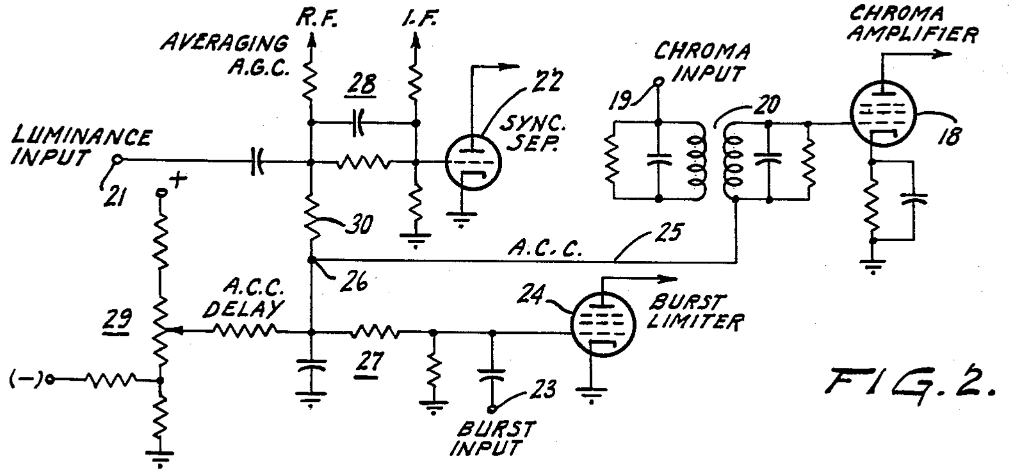
Figure 3:
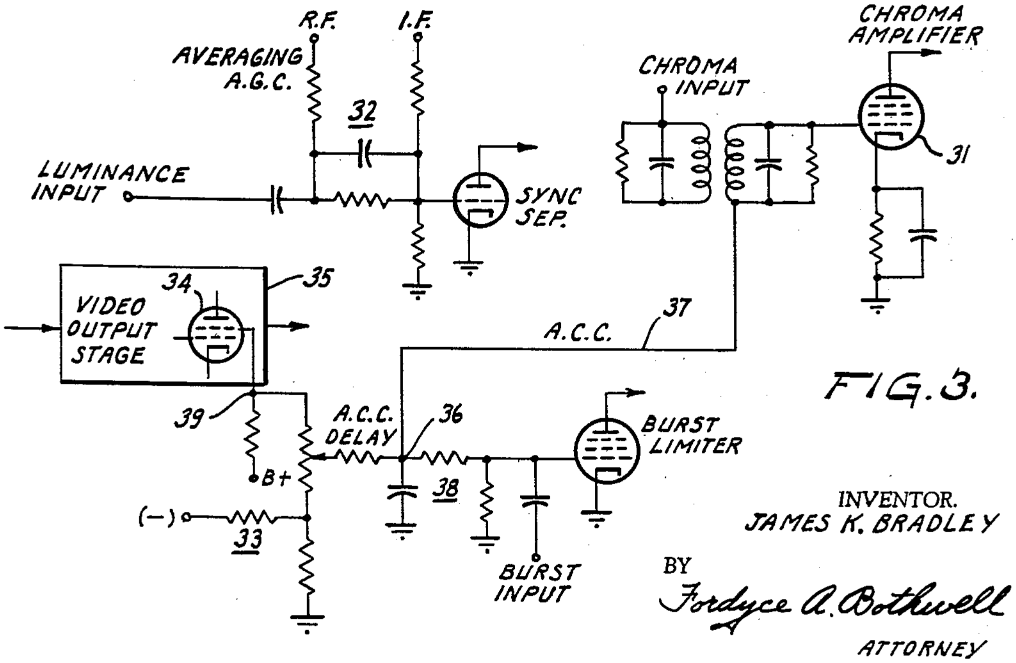

The invention may be fully understood from the following detailed description with reference to the accompanying drawing, wherein FIG. 1 is a simple block diagram showing in a general way the application of this invention to a color television receiver;

FIG. 2 is a schematic illustration of one arrangement according to this invention; and FIG. 3 is a schematic illustration of a different but equivalent arrangement.

Referring first to FIG. 1, the portions shown by solid lines represent conventional elements of a color television receiver employing averaging A.G.C. and A.C.C., while the portions shown by broken lines represent the inclusion of this invention. Block 10 represents conventional receiver circuits including the RF and IF stages and also including circuits for separation of the signal components. From the latter circuits the chroma component is derived at output connection 11, the burst is derived at output connection 12, and the luminance component is derived at output connection 13. As is well understood the burst is supplied to color synchronizing circuits (not shown) and the luminance and chrominance components are supplied to the color image-producing cathode ray tube (not shown) after suitable amplification and color processing. Block 14 represents a conventional chroma amplifier, and block 15 represents conventional automatic chroma control (A.C.C.) by which the gain of amplifier 14 is controlled in inverse relation to the amplitude of the burst. Block 16 represents conventional averaging A.G.C. which controls the overall gain of the receiver by controlling the gain of the RF and IF stages.

Block 17 represents the control provided by this invention which varies the gain of the chroma amplifier 14 in response to the averaging A.G.C. action so as to counteract the aforementioned color degradation. The broken line extending from block 16 to block 17 indicates that the control provided by this invention is responsive to the averaging A.G.C. action but as will be seen from the subsequent description this response to the A.G.C. action may be either direct or indirect.

Referring now to FIG. 2, there is shown one embodiment of this invention by which the gain of the chroma amplifier 18 is additionally controlled directly from the A.G.C. system. The chroma signal is applied at terminal 19 which is coupled through transformer 20 to the control grid of the chroma amplifier. The luminance signal is applied at terminal 21 which is coupled to the grid of the sync separator 22. The burst is applied at terminal 23 which is coupled to the control grid of the burst limiter 24. The controlling bias for the chroma amplifier 18 is applied over connection 25. This bias, which appears at point 26, is a combination of a negative voltage derived from the A.C.C. network 27, a negative voltage derived from the A.G.C. network 28, and a positive voltage derived from the potentiometer arrangement 29 which provides delay control for the A.C.C. The effect of the A.C.C. bias from network 27 is to vary the gain of amplifier 18 in inverse relation to the amplitude of the burst. The effect of the A.G.C. bias from network 28 is to vary the gain of amplifier 18 in direct relation to variations of the receiver gain, so that when the receiver gain is decreased the gain of amplifier 18 is also decreased, and when the receiver gain is increased the gain of amplifier 18 is also increased.

In the embodiment of FIG. 2, the supplemental control of the chroma amplifier 18 is achieved simply by interconnecting conventional A.G.C. and A.C.C. systems through resistor 30. Thus the supplemental control is achieved to prevent degradation of the color picture at very little extra cost.

With the arrangement of FIG. 2, when the average brightness level is high, the A.G.C. action decreases the gain of the receiver and the burst amplitude is reduced, causing decrease of the negative A.C.C. bias derived from network 27. Normally this would increase the gain of the chroma amplifier 18 and would cause over-coloring of the picture. However, the increased negative A.G.C. bias is also applied to the control grid of amplifier 18 and it prevents increase of the gain and thus prevents over-coloring.

When the average brightness level is low, the A.G.C. action increases the receiver gain and the burst amplitude is increased, causing increase of the negative A.C.C. bias derived from network 27. Normally this would decrease the gain of the chroma amplifier 18 and would cause under-coloring of the picture. However, the decrease of the negative A.G.C. bias prevents decrease of the gain and thus prevents under-coloring.

Referring now to FIG. 3, there is shown a different but equivalent arrangement for controlling the gain of the chroma amplifier 31. In this instance there is no direct tie-in with the A.G.C. system shown at 32. However, the gain of the chroma amplifier 31 is controlled in response to the A.G.C. action. In this instance, the gain of the chroma amplifier is supplementally controlled by automatically varying the positive delay voltage in response to the A.G.C. action. The positive terminal of network 33 (corresponding to 29 in FIG. 2) is connected to the screen grid of tube 34 in the video output stage represented by block 35, which tube is either D.C. coupled or has its D.C. signal restored. The bias at point 36, which is applied to the control grid of amplifier 31 over connection 37, is a combination of voltages derived from the A.C.C. network 38 and from point 39 through the potentiometer arrangement 33.

When the average brightness level is high, the A.G.C. action decreases the overall gain of the receiver, and consequently the current in tube 34 increases and the positive voltage at point 39 decreases. Since this voltage is part of the bias applied to the control grid of the chroma amplifier 31, it compensates for the decrease of the negative voltage derived from the A.C.C. network 38 and prevents over-coloring of the picture.

When the average brightness level is low, the A.G.C. action increases the overall gain of the receiver, and consequently the current in tube 34 decreases and the positive voltage at point 39 increases. This compensates for the increase of the negative voltage derived from the A.C.C. network 38 and prevents under-coloring of the picture.

While the invention has been described with reference to certain embodiments, it will be understood that the invention is not limited thereto but contemplates such modifications and further embodiments as may occur to those skilled in the art.

I claim:

1. In a color television receiver for receiving a composite signal including luminance and chrominance components, a variable gain channel to which said chrominance component is supplied, means for controlling the gain of said channel in inverse relation to undesired variations in the amplitude of said chrominance component, thereby to maintain proper coloration of the reproduced color picture, means for controlling the overall gain of the receiver in inverse relation to the average amplitude of said composite signal, the latter control action tending to cause discoloration of said picture with changes of average brightness level of said composite signal, and means operative in response to said overall gain control for controlling the gain of said chrominance channel in opposite relation to the control by said first means so as substantially to prevent the discoloration of said picture with changes of average brightness level of said composite signal.

2. In a color television receiver for receiving a composite signal including luminance and chrominance components, a variable-gain channel to which said chrominance component is supplied, means for controlling the gain of said channel in inverse relation to undesired variations in the amplitude of said chrominance component, thereby to maintain proper coloration of the reproduced color picture, means for controlling the overall gain of the receiver in inverse relation to the average amplitude of said composite signal, the latter control action tending to cause discoloration of said picture with changes of average brightness level of said composite signal, means for producing a control voltage in response to the controlling action of said last means, and means for applying said control voltage to said chrominance channel so as to control its gain in opposite relation to the control by said first means, thereby substantially to prevent the discoloration of said picture with changes of average brightness level of said composite signal.

3. In a color television receiver for receiving a composite signal including luminance and chrominance components and color reference bursts, an automatic chroma control system including a variable-gain chroma amplifier whose gain is controlled in inverse relation to the burst amplitude, thereby to maintain proper coloration of the reproduced color picture, an averaging automatic gain control system which varies the overall gain of the receiver in inverse relation to the average amplitude of said composite signal, the latter control action tending to cause undesired operation of said chroma control system which causes over-coloring of said picture when the average brightness level of said signal is high and under-coloring of said picture when the average brightness level of said signal is low, and means operative in response to the operation of said gain control system for supplementally controlling the gain of said chroma amplifier in opposite relation to the control action of the automatic chroma control system so as substantially to prevent the said over-coloring and under-coloring of said picture.

4. In a color television receiver a composite signal including luminance and chrominance components and color reference bursts, an automatic chroma control system including a variable-gain chroma amplifier whose gain is controlled in inverse relation to the burst amplitude, thereby to maintain proper coloration of the reproduced color picture, an averaging automatic gain control system which varies the overall gain of the receiver in inverse relation to the average amplitude of said composite signal, the latter control action tending to cause undesired operation of said chroma control system which causes over-coloring of said picture when the average brightness level of said signal is high and under-coloring of said picture when the average brightness level of said signal is low, means for producing a control voltage in response to the controlling action of said gain control system, and means for applying said control voltage to said chroma amplifier so as to control its gain in opposite relation to the control action of the automatic chroma control system, thereby substantially to prevent the said over-coloring and under-coloring of said picture.

5. A color television receiver according to claim 4, wherein said chroma control system and said gain control system are interconnected through a resistor to apply said control voltage to said chroma amplifier.

References Cited in the file of this patent

UNITED STATES PATENTS

| | | |
|---|---|---|
| 2,798,900 | Bradley | July 9, 1957 |
| 2,841,643 | Loughlin | July 1, 1958 |
| 2,948,775 | Larky et al. | Aug. 9, 1960 |